United States Patent [19]
Flodell

[11] 3,848,712
[45] Nov. 19, 1974

[54] DEVICE FOR SUPPLYING AN OBJECT PROPELLED ALONG A RAIL OR THE LIKE WITH ELECTRICAL CURRENT

[76] Inventor: Bertil G. Flodell, Snapphenevagen 124, 17534 Jarfalla, Sweden

[22] Filed: Apr. 9, 1973

[21] Appl. No.: 349,407

[52] U.S. Cl. ...................... 191/30, 191/25, 191/49, 191/59.1
[51] Int. Cl. ............................... B60m 1/04
[58] Field of Search ............ 191/22, 23, 25, 29, 30, 191/33, 35, 45, 48, 49, 50, 59, 59.1

[56] References Cited
UNITED STATES PATENTS

| | | | |
|---|---|---|---|
| 2,696,533 | 12/1954 | Hammerly | 191/48 |
| 2,700,705 | 1/1955 | Anjeskey | 191/48 |
| 3,401,239 | 9/1968 | Holden | 191/31 |

FOREIGN PATENTS OR APPLICATIONS

| | | | |
|---|---|---|---|
| 1,174,023 | 3/1959 | France | 191/25 |

*Primary Examiner*—M. Henson Wood, Jr.
*Assistant Examiner*—D. W. Keen

[57] ABSTRACT

A device for supplying a vehicle with electrical current consists of a rail assembly comprising an outer hollow rail having a longitudinal slot and at least one inner profile made from an insulating material with resilient properties. Said inner profiles have longitudinal guides for current carrying rails and are provided with two longitudinal lips projecting through the slot and which normally are in an edge to edge contact with each other thereby closing the rail assembly. The vehicle has a current collector in the shape of a rod the free end of which being introduced between the lips such that wires arranged therein are in electrical contact with said current carrying rails, said part of the collector being stream line shaped so as to successively open the lips during the propelling of the vehicle along the rail assembly.

3 Claims, 3 Drawing Figures

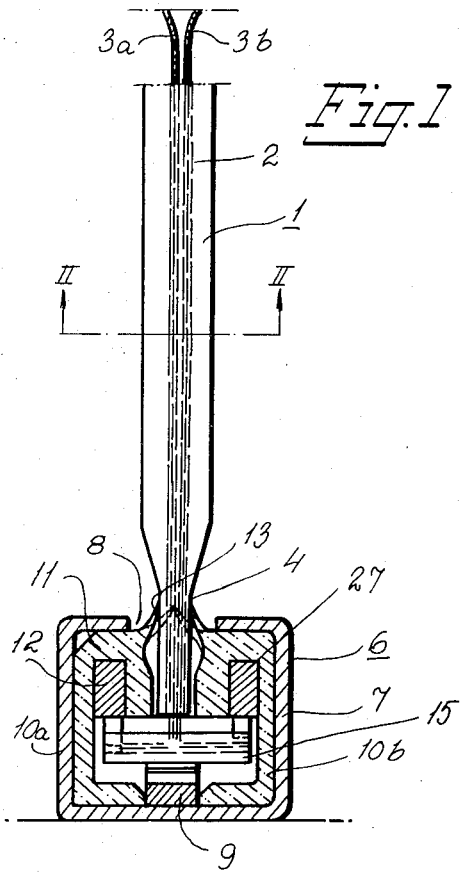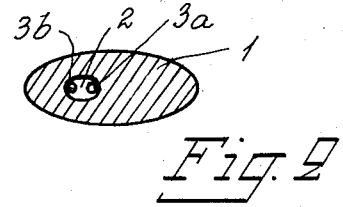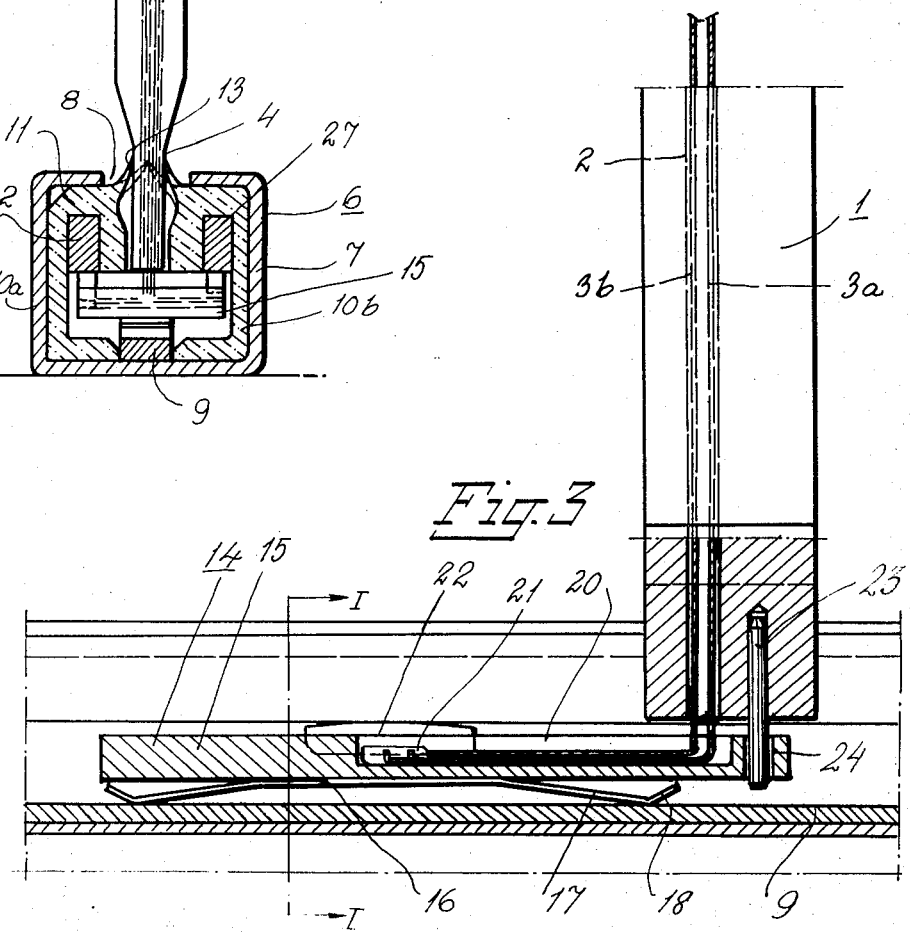

DEVICE FOR SUPPLYING AN OBJECT PROPELLED ALONG A RAIL OR THE LIKE WITH ELECTRICAL CURRENT

This invention refers to a device for supplying a vehicle which is intended to be propelled along a rail or the like with electrical current for driving an electric motor carried by said vehicle.

In designing such devices it is of importance that the current carrying rails extending in the length direction of the rails are adapted so as not to constitute a risk for persons in the vicinity and so as to protect said current carrying rails and parts connected thereto from impurities, moisture and the like. These objects have heretofore only been partly realised and the main object of the invention is thus to design a device which fulfills the objects as pointed out and which may be manufactured at low costs and in a rigid and sturdy manner.

To obtain these and similar objects the invention is carried out according to the accompanying claims.

An exemplary embodiment of the invention is illustrated in the attached drawing in which FIG. 1 illustrates a transverse section through a guiding rail assembly for guiding a load carrier, propelled along the rail in question.

FIG. 2 is a transverse section through the lower part of a current collector projecting from the load carrier.

FIG. 3 is a longitudinal section through part of the rail shown in FIG. 1 having a current collector inserted therein.

The numeral 1 generally designates a current collecting means, intended to be connected to a load carrier or the like (not shown). The current collecting means 1, preferably made from an electrically insulating material has one or several channels or grooves 2 for electric conductors like insulated wires 3a respectively 3b. In its lower end the current collecting means has a narrower part 4 having the shape of an elongated ellipse (see FIG. 2) for a purpose to be explained. Secured to the lower end of the current collecting means is a downwardly projecting follower pin 23 (see FIG. 3).

The rail assembly which is intended to constitute a guidance for the load carrier is generally designated 6 and comprises a profile 7 having a generally rectangular section and being provided with a longitudinally extending slot 8. Said outer rail is preferably made from metal or similar relatively resistant material. Secured to the part of the rail which is opposite to the slot 8 is a longitudinal ground rail 9. Resting against the vertical side edges of said ground rail 9 are two plastic profiles, generally designated 10a respectively 10b and being reversed relative to each other. As the profiles are symmetrical relative to a central, vertical plane through the rail construction only one of the profiles will now be described more in detail. This profile 10a, which like the rail 10b follows the rail 7 along its entire length is in its upper part reversely U-shaped 11 and this U-shaped part encloses a current carrying rail 12. From the web portion of the U-shaped part extends a resilient lip or tongue 13 which normally takes the position shown in dotted lines in FIG. 1. Together with a corresponding lip or tongue of the other plastic profile 10b these longitudinal tongues or lips will close the entire rail construction 6 upwards. A sliding body, generally designated 14, is displaceably arranged inside the rail construction. This sliding body includes a rail 15, to the under side of which is secured the middle portion 16 of a leaf spring which has obliquely downwards bent portions 17 which end in contact portions 18 which are intended to rest against the upper side of the ground rail 9. The rail 15 has in its upper side a recess 20 by means of which the wires 3a, 3b may be each connected to a contact means 21 which by means of carbon-brushes or the like 22 is in conducting connection with the current carrying rail 12 respectively 27 (see also FIG. 1). The rail 15 has an opening 24 for receiving follower pin 23.

It is obvious that the sliding body 14 thanks to its design assures a good contact between on one hand the wires 3a, 3b and the current carrying rails 12 and 27 and on the other hand between the sliding body and parts connected thereto and the ground rail 9. The sliding body may also be displaced along the rail construction with a small power. As appears from FIG. 1 the current collecting means of the load carrier has its part 4 inserted in the rail construction 6. This has been accomplished by bending the tongues 13 out from each other such that said part 4 may be inserted therebetween. Thanks to the stream line shape of part 4 of the current collecting means said means will during its movement along the rail construction 6 successively separate the tongues 13 which normally are in contact with each other. Said shape also assures that the tongues are in contact with each other at a small distance in advance of respectively behind the current collecting means. Thus a closed rail construction is obtained in spite of the fact that the current collecting means is displaced along the rail. Said current collecting means thus cuts itself through the opening of the rail construction 6. It is obvious that it is impossible for a person to come into contact with the fully encapsuled current carrying rails 12 and 27 and that said parts like other parts of the construction by means of the closure generated by the lips or tongues 13 are effectively protected from impurities, moisture and the like.

The device here described and illustrated is but an example of how the invention can be realised. It is for instance possible to manufacture the rail construction 6 in one single piece from plastic material, the current carrying rails 12, 27 may be obliquely adapted, converging upwardly etc.

I claim:

1. A device for supplying a vehicle with an electric drive motor, with current comprising a vehicle carried rod-like current collecting means with a stream lined shaped part, wires housed extending through said means for connection to the vehicle drive motor, a hollow outer rail having a longitudinal slot, a hollow member of electrical insulating material housed within and extending the length of said outer rail and having a slot in line with said outer rail slot, said insulating member having a pair of resilient lips normally closing said insulating member slot having said rod-like means extending between said lips through said insulating member slot, current carrying means in said insulating member, a body slideably mounted in said insulating means and contacts carried by said body connected to wires and slideably engaging said current carrying means.

2. A device as claimed in claim 1 wherein said insulating member has two U-shaped portion with each portion having one leg which is extended and has an L-shape engaging two inner surfaces of said outer rail and a second leg integral with one of said lips.

3. A device as claimed in claim 1 wherein said sliding body comprises a block, a leaf spring on said block with free ends extending from said block providing supporting surfaces for said block, a pin carried by said rod-like means, said block having a opening with said pin extending therein, contact means in a side of said block opposite said spring, a ground rail in said outer rail having said spring slideably positioned thereon and said current carrying means slideably engaging said contact means.

* * * * *